(12) United States Patent
Balakrishnan

(10) Patent No.: US 6,233,559 B1
(45) Date of Patent: *May 15, 2001

(54) SPEECH CONTROL OF MULTIPLE APPLICATIONS USING APPLETS

(75) Inventor: Sreeram Balakrishnan, San Francisco, CA (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,432

(22) Filed: Apr. 1, 1998

(51) Int. Cl.[7] ................................................. G10L 15/00
(52) U.S. Cl. ........................................ 704/275; 704/270.1
(58) Field of Search ................................... 704/200, 243, 704/251, 270, 275, 270.1

(56) References Cited

U.S. PATENT DOCUMENTS

| | | | |
|---|---|---|---|
| 5,384,892 | * | 1/1995 | Strong .................................. 704/243 |
| 5,390,279 | * | 2/1995 | Strong .................................. 704/200 |
| 5,513,298 | * | 4/1996 | Stanford et al. ....................... 704/243 |
| 5,613,036 | * | 3/1997 | Strong .................................. 704/243 |
| 5,632,002 | | 5/1997 | Hashimoto et al. . |
| 5,799,279 | * | 8/1998 | Gould et al. .......................... 704/275 |
| 5,819,220 | * | 10/1998 | Sarukkai et al. ...................... 704/243 |
| 5,960,399 | * | 9/1999 | Barclay et al. ....................... 704/270 |

OTHER PUBLICATIONS

Rash, Wayne, "Talk Show", PC Magazine, Dec. 1994, pp 203–219.*
Schmandt, Chris et al., "Augmenting a Window System with Speech Input", 1990 IEEE, pp. 50–56.

* cited by examiner

Primary Examiner—David D. Knepper
(74) Attorney, Agent, or Firm—Hugh C. Dunlop; Romi N. Bose; Hisashi D. Watanabe

(57) ABSTRACT

A computer operating system (30) receives information from first and second application programs relating to control words for controlling the application programs. This information is contained in vocabulary A (74) and vocabulary B (76). The speech recognition tool (36) is arranged to accept the information from the first and second application programs and perform a comparison with digitized speech received at an input (60). A selected one of the application programs (32 and 34) is controlled according to the digitized speech received.

14 Claims, 3 Drawing Sheets

SPEECH CONTROL OF MULTIPLE APPLICATIONS USING APPLETS

FIELD OF THE INVENTION

This invention relates to a computer operating system with voice recognition.

BACKGROUND OF THE INVENTION

With the proliferation of computers and computing devices throughout society, more and more attention is being turned to alternative methods of data entry to replace traditional keyboards. Numerous computer programs are available which perform recognition of speech. Most of these computer programs are "applications", that is to say computer programs in which the functionality and operation of a program is specifically tailored to a dedicated purpose for the program. Thus, for example, dictation applications are known, which accept a user's voice as input and cause text to be entered into a document, corresponding to the user's voice input, in a manner similar to a word processor. Another example of a speech recognition application would be a control program for controlling an item of equipment, for example, for dialing telephone numbers in a hands-free radio telephone. In such an application, the user would speak the digits to be dialed and would, for example, speak the command "send", causing the cellular radio telephone to dial the number spoken. These are examples of dedicated speech recognition applications.

In the paper "Augmenting a Window System with Speech Input" by C. Schmandt, M. S. Acherman, and D. Hindus in Computer, Vol. 23, No. 8, pages 50–60, August 1990, a voice recognition application is described for control of window navigation tasks. The application, entitled "X Speak" is a speech interface to an X window system, in which words are associated with windows. Speaking a window's name moves it to the front of the computer screen and moves the cursor into that window. The X Speak application assumes some of the functions normally assigned to a mouse. Various commands are described, such as "create" for starting an application, "recall" for repositioning a window to the top of a window stack, and "hide" for repositioning a window to the bottom of the window stack. There are also commands for resizing and repositioning windows, etc. The authors of the paper admit that any ergonomic efficiency from use of the window navigation tasks application is limited or non-existent.

A disadvantage with existing speech recognition applications is their lack of flexibility. In a typical speech recognition application, a vocabulary of recognizable words is associated with the application. The recognizer attempts to recognize words from within its vocabulary. Techniques can be provided to attempt to recognize words that are not within the vocabulary. Vocabularies can be expanded or replaced to tailor the performance of the recognition operation to the user.

In the case of the X Speak application, which is a tool associated with an operating system, there is a dedicated set of possible commands which can be recognized. The available set of commands is pre-programmed into the application. This provides for lack of flexibility and is not highly suited to modern multi-application personal computers and similar equipment, in which new applications are loaded into the equipment from time to time and in which many applications can be run consecutively.

There is a desire to have a more ubiquitous speech recognition interface, potentially capable of at least partially replacing both a keyboard for data and command entry and a mouse for screen navigation.

Greater flexibility for application developers, who wish to speech-enable their applications, is provided by a speech application programming interface (SAPI) from Microsoft Corporation, which permits a general purpose speech search engine to recognize commands of different applications. No provision is made for directing speech to any application other than a current in-focus application or for handling multiple speech-enabled applications. No provision is made for recognizing commands for an application that has not yet been activated and run for the first time.

There is a desire for the speech interface to direct speech to multiple applications or applications that are newly installed and have not yet been operated.

It is also a problem that speech may include operating system commands (e.g. "minimize window", "close window") as well as application directed speech commands (e.g. "begin dictation") and application directed content (e.g. "Memo to Mr. Jones). There is a need to determine the most appropriate destination for the speech, which cannot readily be done without performing recognition, which preferably must be tailored to the potential task to which the speech may be directed. For this, a vocabulary and language model (or its equivalent) specific to the task is desirable.

DETAILED DESCRIPTION OF THE DRAWINGS

Figure 1:
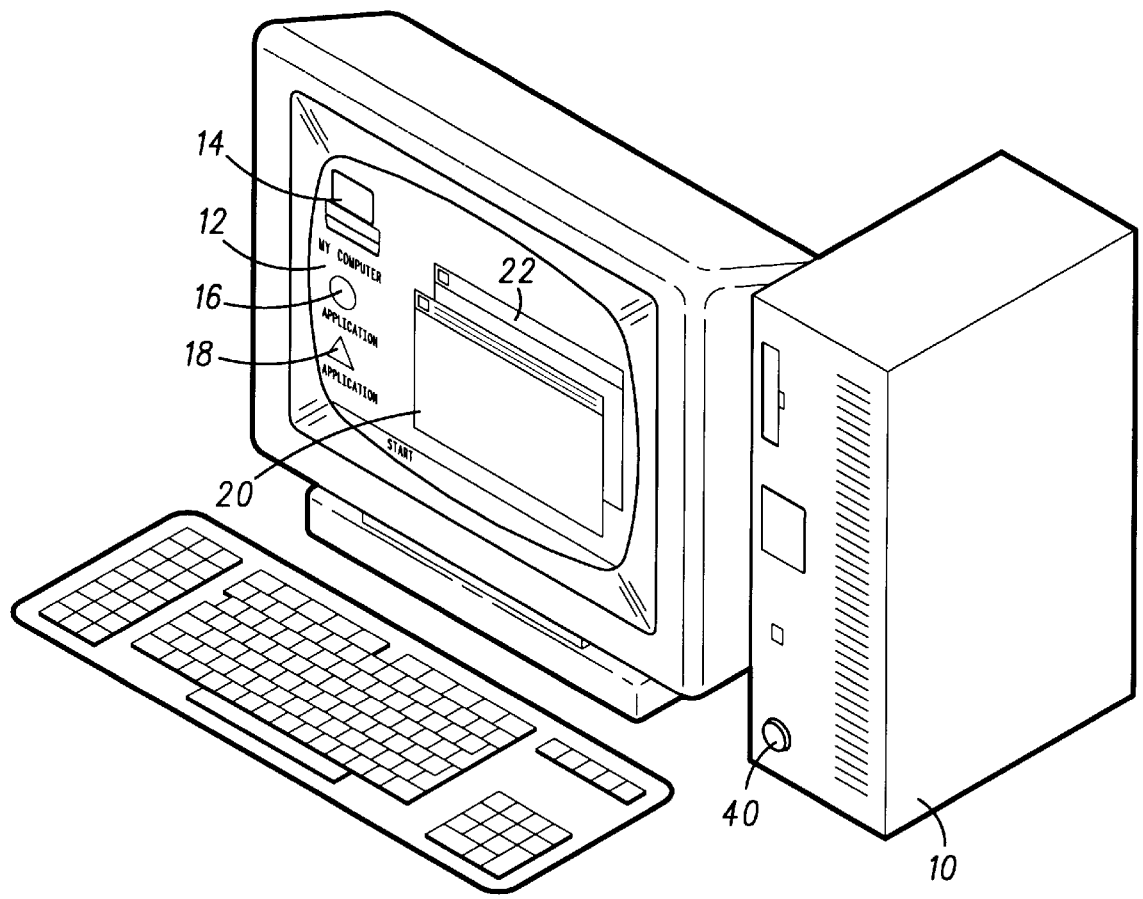
FIG. 1 shows a typical personal computer with multiple application icons displayed on a screen, suitable for implementation of the invention.

There will now be described an architecture in which multiple applications with voice recognition capability have the opportunity to indicate to the operating system whether given speech input is useful to the individual applications. This has an advantage that an application is better situated than the operating system for making a determination as to whether certain speech is relevant to the application. A better decision can be made as to whether the speech shall be directed to the operating system or to a particular application.

A computer 10 is shown having a screen 12, on which are shown various icons and windows. The computer is shown as having an icon 14 representing a hard drive located in the computer 10 and a first application icon 16 representative of a first application stored in the computer 10 and a second application icon 18, representative of a second application stored in the computer 10. The first application has the name "App A" and the second application has the name "App B". Also shown on the screen 12 are a first window 20 and a second window 22. The first window 20 is "in focus", in the sense that it is in the foreground and is the currently active window. The second window 22 is "out of focus", in that it is in the background. For purposes of description, the example will be considered where the first window 20 is an input/output interface window for Application A and the second window 22 is an input/output user interface for the Application B.

In typical prior art operation, the window 20 is created by moving a mouse cursor to the icon 16 and double-clicking on the icon 16. Similarly, the second window 22 is typically created by moving a mouse cursor to the icon 18 and double-clicking on that icon. Double-clicking on an icon causes the application represented by the icon to be invoked or "launched". Thereafter, a single click of the mouse cursor on either the icon or its corresponding window causes that window to come into focus. There can, of course, be multiple windows which correspond to a single application.

There is a microphone 40 shown in FIG. 1 which can receive voice commands as voice input. The voice commands may cause operations to be performed within Application A or Application B. The voice input may cause text or other information to be entered into files created by Application A or Application B. The present invention addresses the problem of deciding to which application voice commands or voice input should be directed.

Figure 2:
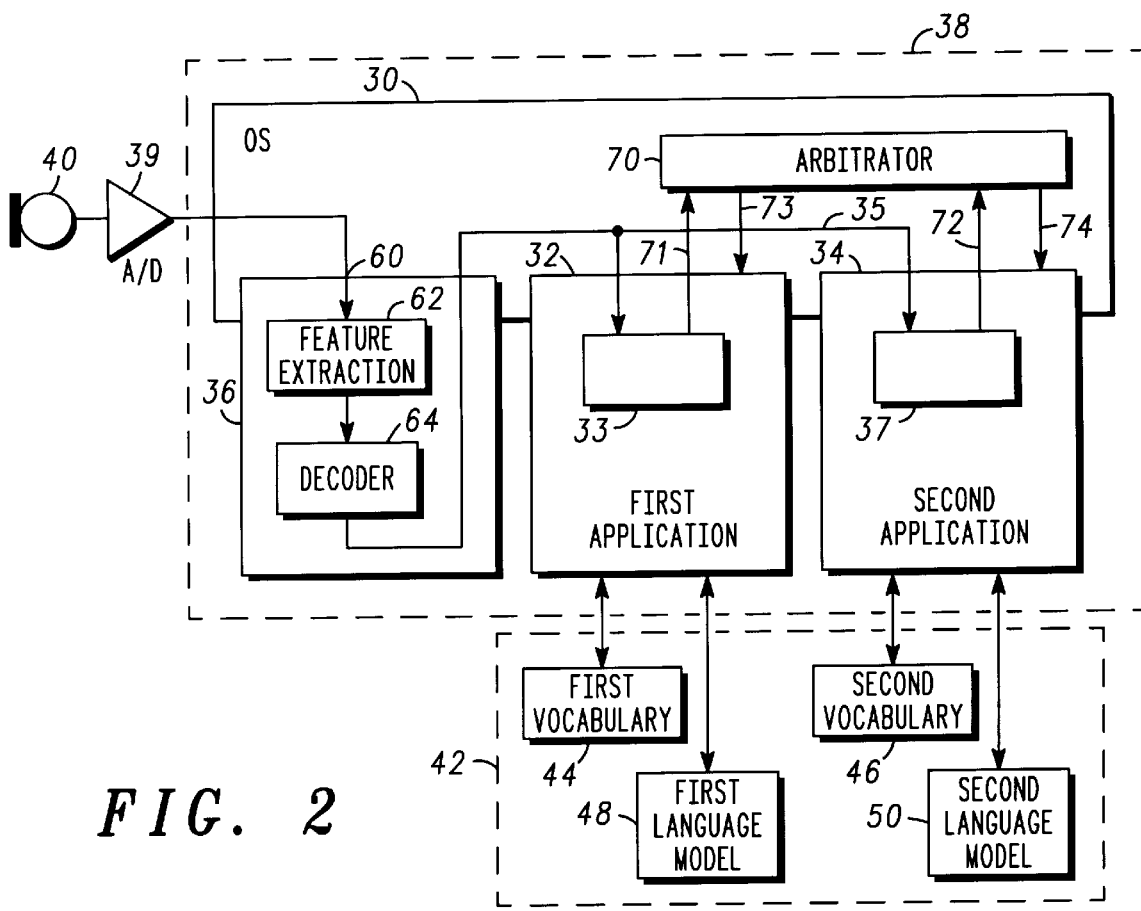
FIG. 2 is a block diagram of a set of computer programs in accordance with the invention.

Referring now to FIG. 2, a set of computer programs are illustrated, which include an operating system 30, a first application 32, a second application 34, and a phoneme network generator 36. This set of computer programs is loaded into a microprocessor 38 which resides in the computer 10. Connected to the microprocessor 38 via an analog-to-digital converter 39 is a microphone 40. Also connected to the microprocessor 38 is a memory 42, which may be random access memory, but is preferably read-only memory. Stored in the memory 42 are first and second vocabularies 44 and 46 and first and second language models 48 and 50, associated with the first and second applications 32 and 34 respectively.

The phoneme network generator 36 is preferably a context dependent (CD) phoneme network generator as described in copending patent application Ser. No. 08/980,954 of Sreeram Balakrishnan et. al., filed on Dec. 16, 1997, entitled "Context Dependent Phoneme Networks For Encoding Speech Information", assigned to the same assignee as the present patent application and incorporated herein by reference. Alternatively, the phoneme network generator 36 is context independent.

Referring to the details of the programs implemented in the microprocessor 38, the phoneme network generator 36 comprises an input 60, coupled to the analog-to-digital converter 39. A feature extraction program module 62 is coupled to the input 60 and a (preferably a Viterbi decoder) program module 64 is coupled to the feature extraction program module 62. The decoder 64 has an output coupled to the first and second applications 32 and 34 respectively, via an application programming interface (API) 35 of the operating system 30.

The first application 32 has a search applet 33, which is able to call up the first vocabulary 44 and the first language model 48. The second application 34 has a search applet 37, which is able to call up the second vocabulary 46 and the second language model 50. Each vocabulary has words or characters that are potentially required to be recognized by the respective application. Each language model has words or combinations of words, letters or characters that are common in usage of that application. There may (and indeed there generally will) be words or characters that are common to both applications.

The example will be considered where Application A is "Netscape"™ and Application B is WisdomPen™. There are commands in the first vocabulary 44 that are useful to a browser, such as "start", "open", "go back", "search", "home", and "Netscape", and there are commands in the second vocabulary 46 that are useful to a handwriting recognizer, such as "start", "open", "next character", "phrase", "edit", "WisdomPen", etc. Note that the command "start" is common to both vocabularies. Note that the word combination "start Netscape" is unique to the first vocabulary 44 while "start WisdomPen" is unique to the second vocabulary 46. Even if these word combinations are not unique, note that the first language model 48 gives a high probability score to the word combination "start Netscape" and a low probability score to the word combination "start WisdomPen." Note also that the second language model 50 gives a high probability score to the word combination "start WisdomPen" and a low probability score to the combination "start Netscape."

In operation, a user speaks a command into the microphone 40, his speech is digitized in A/D converter 39 and features are extracted in feature extraction program module 62. Decoder 64 generates a CD phoneme network from the extracted features and outputs (on API 35) data representing, for a given phoneme, the identities of the previous and subsequent phonemes, the identity of the present phoneme, the duration of the present phoneme and the score of the present phoneme (or scores for a small number of alternative phonemes). The CD network so generated is sent to (or picked up by) the search applets 33 and 37 of the applications 32 and 34 simultaneously. Using the data in the vocabularies 44 and 46 and the language models 48 and 50, each of the applets 33 and 37 provides a result of its recognition operation, including at least a "score" or "confidence level" for recognition. These scores are delivered by the applications 32 and 34 to an arbitrator 70 in the operating system 30, via API outputs 71 and 72 respectively. The arbitrator 70 determines which of the multiple applications is to act upon the input speech.

The arbitrator 70, in its simplest form, determines that the application providing the highest recognition score will receive the input speech and act upon it.

Thus, for example, if the input speech is "go back" or "start Netscape", the arbitrator 70 will inform application A via control output 73 that application A is to act on the input speech and it will inform application B via control output 74 that it is to ignore the input speech. On the other hand, if the input speech is "start WisdomPen" or "edit", it will be application B that is permitted to act on this input. The action taken in response to the input can include starting the application, bringing the application's window to the foreground, changing mode within the application, entering the data into a file within the application, or other operations.

In a more advanced form, the arbitrator 70 is context-dependent, e.g. it gives a higher priority to an in-focus application that an out-of-focus application. A higher threshold level of confidence in recognition must be exceeded to direct input speech to an out-of-focus application and a lower threshold level of confidence will permit input speech to be directed to the current application. Alternatively, or in addition, the arbitrator 70 distinguishes between commands and input data or it distinguishes between different types of commands. For example, a key set of commands ("start", "open", "quit") will be directed by arbitrator 70 to an out-of-focus application more readily (i.e. even at lower confidence levels) if accompanied by a high confidence level indicator (e.g., "Netscape" or "WisdomPen") than other commands or inputs. To achieve this, the key set of commands can be stored in the arbitrator 70.

In this way, each of the applications 32, 34 (and additional applications) offers up to the operating system 30 a request for the operating system 30 to arbitrate and permit the application to receive and act upon incoming speech, in preference to other applications.

Thus, a processor 38 has been described comprising: an input 60 for receiving voice commands; an operating system 30 having an arbitrator 70; and one, two or more application programs 32, 34 under the control of the operating system. The application programs are modularly separate from the operating system. The or each application has a voice recognizer 33, 37 for recognizing voice commands and presenting to the arbitrator 70 recognition information 71, 72 indicative of the voice recognizer's ability to recognize the voice commands.

The recognition information is preferably dependent on the vocabulary 44 and the language model 48 of the application program.

A method of operation of a computer has also been described. The method comprises: entering voice commands; comparing the voice commands entered with representations of the voice commands associated with the application program to provide a recognition result; providing the recognition result to the operating system; and selectively permitting the application program to act on the voice commands, dependent on the recognition result.

The method preferably further comprises generating, in association with the operating system, phoneme networks representative of the voice commands and delivering the phoneme networks to the application program. The phoneme networks are preferably context-dependent phoneme networks.

In the preferred embodiment, the voice commands entered are compared with representations of the voice commands associated with the first and second recognition results and the step of selectively permitting comprises permitting one of the first and second application programs to act on the result in preferences to the other application program as a function of a current mode of operation of the first and second application programs.

In addition, a data storage medium has been described comprising instructions and data which, when loaded onto a general purpose processor, cause the processor to comprise: an output for receiving digitized voice; a phoneme generator for generating phoneme identification information; an interface for interfacing with first and second application programs; and an arbitrator. The interface is arranged to deliver the phoneme identification information to the first and second applications and to deliver recognition information from the first and second application programs to the arbitrator, and the arbitrator is arranged to arbitrate between the first and second application programs based on the recognition information and to control a selected one of the first and second application programs according to the digitized voice received.

The first and second applications have been described as preferably comprising first and second vocabularies, respectively, and first and second language models, respectively, such that a given digitized voice command results in different recognition information from the first and second applications.

Also described is a method of installing an application program in a computer comprising: registering the application program with an operating system; extracting from the application program selected commands and their phonetic representations; and delivering the commands and phonetic representations to a vocabulary of a search engine.

Figure 3:
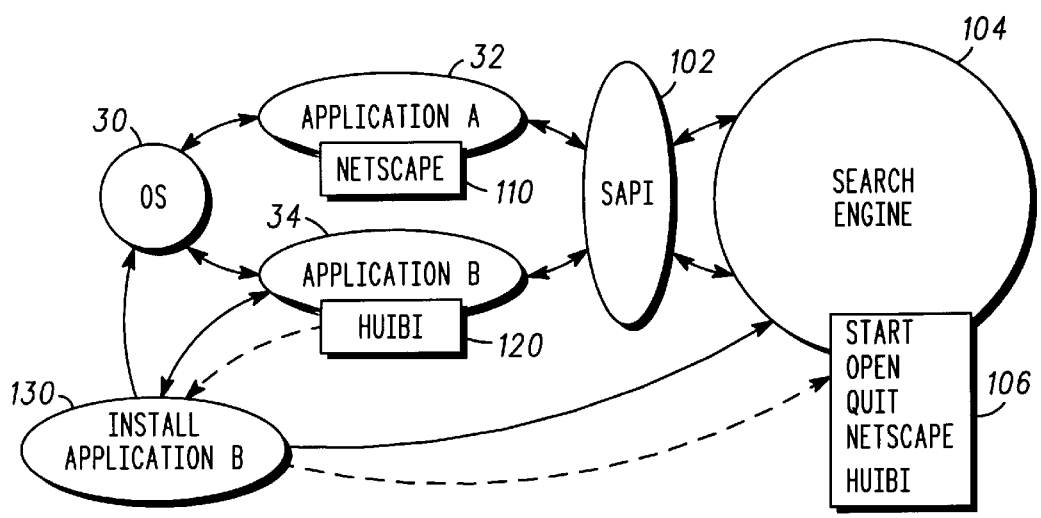
FIG. 3 is a process flow diagram illustrating an alternative embodiment of the invention.

Referring now to FIG. 3, an arrangement is illustrated for permitting an input voice command specific to an application program to be recognized before the application program has been run for the first time.

The operating system 30, and the first and second applications 32 and 34 are illustrated. The applications are coupled by a speech application programming interface 102 to a search engine 104. Each of the application programs 32 and 34 has a vocabulary 110, 120 (which are equivalent to or are portions of the vocabularies 44 and 46 of FIG. 2). In the example, vocabulary 110 has the word "Netscape" and vocabulary 120 has the word "Huibi" which is the Chinese equivalent of "WisdomPen".

The search engine 104 has an active vocabulary 106 which includes many common commands, such as "start", "open", "quit", and also has the word "Netscape" which is either pre-programmed into the search engine vocabulary 106 (being a commonly used word) or has been provided to the vocabulary 106 from vocabulary 110 in earlier operation of application program 32. By contrast, the word "Huibi" is not a very common word and through normal operation is unlikely to be present in the vocabulary 106.

An installation program 130 is used to install Application B. Upon installation, the program 130 registers Application B with the operating system 30 and at the same time extracts words and their phoneme network equivalents from vocabulary 120 and inserts these words and phoneme network equivalents into search engine vocabulary 106.

In this manner, when the command "start Huibi" is spoken for the first time, this command is recognized by the search engine 104. The search engine 104 is able to cause the application 34 to be started by the operating system 30.

The application programs 32 and 34 are modularly separate from each other. This has the significant advantage that either one of these applications can be removed or replaced without affecting the operation of the system. Additionally, further applications can be added. Each time an application is added (or one is replaced) the new application has its own operating system vocabulary that is delivered, at installation, to the operating system to enable the operating system to search for commands that are relevant to that application. This is a significant improvement over prior arrangements, as there is no need to update the operating system itself with new voice commands, etc. and there is no need to train the operating system or to expand any vocabulary associated with the speech recognizer 36 to enable the system to expand and be upgraded. Either one of the first and second applications can be removed without degrading the performance of the other application.

Figure 4:
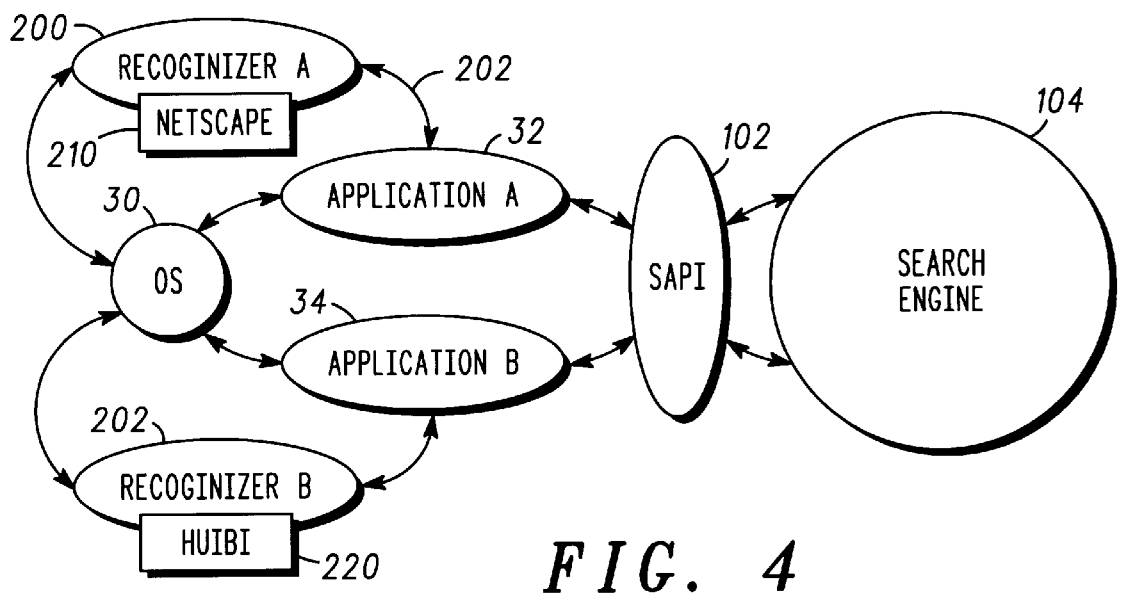
FIG. 4 is a process flow diagram illustrating an embodiment of the invention that is alternative to the embodiment of FIG. 3.
Figure 5:
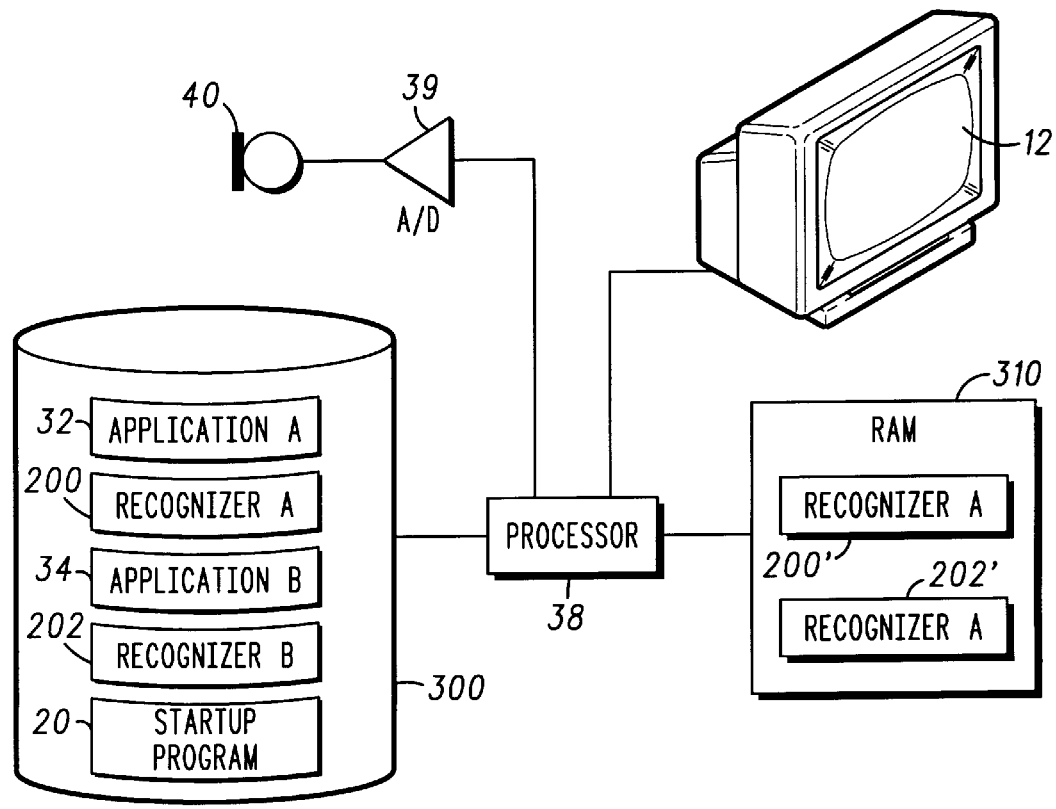
FIG. 5 is a hardware block diagram further illustrating the embodiment of FIG. 4

A further embodiment of the invention, which is alternative to the embodiment of FIG. 3 and is complementary to or an enhancement of the embodiment of FIG. 2, is illustrated in FIGS. 4 and 5.

Referring to FIG. 4, the alternative arrangement of the software provides for a first recognizer 200 (referred to as recognizer A) and a second recognizer 202 (referred to as recognizer B). These recognizers are mini-applications that are launched by the operating system 30 at start up of the microprocessor 38. These recognizers are independent of applications A and B, but are employed by applications A and B in a manner described below. Attached to recognizer A is a small vocabulary 210 at key words, similar to the vocabulary 110 of FIG. 3. Attached to the recognizer B is a second vocabulary 220 of keywords, similar to the vocabulary 120 of FIG. 3.

In operation, operating system 30 causes recognizers A and B to be launched at start-up of the microprocessor 38.

This means that the recognizers A and B are transferred from non-volatile memory, such as hard disk, to random access memory in the computer 10. Applications A and B are not necessarily launched at this time. As speech is input to the microphone 40, phonetic representations of the speech (for example, triphone network representations) are offered by the operating system 30 to both recognizer A and recognizer B. These recognizers continuously search the received phonetic representations of the input speech for the keywords stored as phonetic representations in vocabulary 210 and vocabulary 220 respectively. Recognizers A and B continuously offer scores to the operating system 30, indicating the degree of correlation between the input speech and the keywords stored in the respective vocabularies 210 and 220. The arbitrator 70 in the operating system 30 (see FIG. 2) compares the scores and makes a determination as to whether one of the applications A and B should be launched. Thus, for example, if the words "open Netscape" are received at the microphone 40, Recognizer A will deliver a high score for this command and Recognizer B will deliver a low score. Moreover, the score for the command "open Netscape" delivered by recognizer A will be sufficiently high (for example exceeding a pre-determined threshold) for the arbitrator 70 to make a determination that the words "open Netscape" are intended to be a command for launching of application 32 (and not, for example, some input text intended for some other application).

Upon making this determination, operating system 30 launches application A. Launching or initiating of application A causes that application to be transferred from non-volatile memory into random access memory, and application A becomes fully functional and begins using processing power from the microprocessor 38. Meanwhile, application B continues to reside solely in non-volatile memory and is not consuming any processing capacity.

Once launched, application A continues to use recognizer A (via link 202) to perform recognition operations for content that is delivered from the microphone 40 and targeted at application A. Application A can also at this time supplement very substantially the vocabulary that the recognizer is to use and can introduce language modeling features, which are not necessarily required prior to launching of application A. In other words, when recognizer A is searching for keywords, recognizer A requires a minimum of language modeling capability, whereas the language modeling capability employed by recognizer A is significantly increased when application A is launched.

Similarly, when recognizer B delivers to the operating system 30 a high score for a command or set of words stored in vocabulary 220, operating system 30 will lunch application B.

In an entirely analogous manner, recognizer A or recognizer B can deliver to the operating system a high score for a command such as "quit Netscape" or "quit Huibi", where upon operating system 30 can recognize these commands and can cause the respective application A or B to be closed.

Referring to FIG. 5, the applications A and B and the recognizers A and B are illustrated in their start-up mode in the computer 10. FIG. 5 illustrates a hard disk drive or other non-volatile memory 300, and it illustrates a random access memory 310, both coupled to the processor 38. Residing in the non-volatile memory are the applications 32 and 34 and the mini-recognizers 200 and 202. Also shown in the non-volatile memory 300 is a start-up program 320.

At start-up of the processor 38, the processor, by default, looks to the non-volatile memory 300 for its start up program and finds the start up program 320. Start-up program 320 causes recognizers 200 and 202 to be loaded through the processor 38 into the random access memory 310. These recognizers are shown resident in random access memory 310 as recognizers 200' and 202'. Applications 32 and 34 have not yet been loaded into the random access memory 310 and are not taking up valuable memory space at this time. Similarly, they are not using processor power from the processor 38. The applications A and B are very much larger than their respective recognizers 200 and 202, so it is tolerable to load the recognizers into the random access memory without loading the complete applications. When one of the recognizers 200' and 202' provides a high score for a command that is relevant to the recognizer's respective application, the processor 38 causes that application to be transferred from the non-volatile memory 300 into the random access memory 310.

The above description of the preferred embodiments has been given by way of example only and modifications of detail can be made by one skilled in the art, without departing from the spirit and scope of the invention.

I claim:
1. A processor comprising:
    an input for receiving spoken commands;
    an operating system having an arbitrator;
    one or more applications each having a search applet, the one or more applications under the control of the operating system and modularly separate from the operating system;
    one or more vocabularies that may be called by the search applet, each of the one or more vocabularies having commands pertinent to one of each said applications; and
    one or more language models that may be called by the search applet, each of the one or more language models having language constraints pertinent to one of each said applications;
    the operating system comprising a speech recognizer for recognizing spoken commands and, based on the data found in the vocabularies and language models, obtaining a confidence level for recognition to enable the one or more applications to automatically present to the arbitrator recognition information indicative of the voice recognizer's ability to recognize the spoken commands, the arbitrator determining based on the confidence level which of the at least one or more applications is to respond to the spoken commands and permitting the determined application to act on the spoken command and instructing the remaining applications to ignore the spoken command the arbitrator further adapted to direct commands to one of the one or more applications based on whether the one application is in the foreground or in the background.
2. A method of operation of a computer having an operating system and at least one application program, comprising:
    entering spoken commands;
    providing a search application associated with each application program;
    providing one or more vocabularies that may be called by the search application, each of the one or more vocabularies having commands pertinent to one of each said applications;
    providing one or more language models that may be called by the search applet, each of the one or more language models having language constraints pertinent to one of each said applications;

repeatedly comparing the spoken commands entered with representations of the spoken commands associated with the application program to provide recognition results and to obtain a confidence level for the recognition results;

providing the recognition results to the operating system;

determining which application is in the foreground and which is in the background; and selectively permitting, based on the application program that obtained the highest confidence level for the recognition result and also based on whether the application program is in the foreground or background, the application pogram to act on the spoken commands and instructing the remaining applications to ignore the voice commands.

3. The method of claim 2, further comprising generating, in association with the operating system, phoneme networks representative of the spoken commands and delivering the phoneme networks to the application program.

4. The method of claim 3, wherein the phoneme networks are context-dependent phoneme networks.

5. The method of claim 2, wherein the voice commands entered are compared with representations of the spoken commands associated with first and second application programs substantially simultaneously to provide first and second recognition results.

6. The method of claim 5, wherein the step of selectively permitting comprises permitting one of the first and second application programs to act on the result in preference to the other of the first and second application programs.

7. The method of claim 6, wherein the step of selectively permitting comprises arbitrating between the first and second application programs as a function of a current mode of operation of the first and second application programs.

8. The method of claim 5, further comprising generating, in association with the operating system, phoneme networks representative of the spoken commands and delivering the phoneme networks to the first and second application programs.

9. The method of claim 8, wherein the phoneme networks are context-dependent phoneme networks.

10. A data storage medium comprising instructions and data which, when loaded onto a general purpose processor, cause the processor to comprise:

an input for receiving digitized speech;

a phoneme generator for generating phoneme identification information;

an interface for interfacing with first and second application programs; and an arbitrator;

wherein the interface is arranged to deliver the phoneme identification information to the first and second applications and to automatically deliver recognition information from the first and second application programs to the arbitrator, the recognition information being ranked according to both a predetermined confidence level and whether the application is in the foreground or the background and wherein the arbitrator is arranged to arbitrate between the first and second application programs based on the recognition information and to control a selected one of the first and second application programs according to the digitized speech received, the arbitrator enabling the application having the higher confidence level to be executed and to instruct the remaining application to ignore the digitized speech.

11. The data storage medium of claim 10, wherein the first and second applications comprise first and second dictionaries, respectively, and first and second language models, respectively, such that a given digitized spoken command results in different recognition information from the first and second applications.

12. A method of installing an application program in a computer comprising:

registering the application program with an operating system;

extracting from the application program selected commands and their phonetic representations; and automatically delivering the commands and phonetic representations to a vocabulary of a search engine.

13. A method of operation of a computer comprising:

invoking a first recognizer associated with a first application that is not yet invoked;

invoking a second recognizer associated with a second application that is not yet invoked;

receiving a spoken command;

performing recognition of the spoken command in the first and second recognizers to automatically provide first and second recognition results;

arbitrating between the first and second recognition results; and invoking one of the first and second applications dependent on the step of arbitrating and instructing a second of the first and second applications to ignore the spoken command.

14. The method of claim 13, wherein the first recognizer performs speech recognition for the first application when invoked and the second recognizer perform speech recognition for the second application when invoked.

* * * * *

UNITED STATES PATENT AND TRADEMARK OFFICE
CERTIFICATE OF CORRECTION

PATENT NO.   : 6,233,559 B1
DATED        : May 15, 2001
INVENTOR(S)  : Balakrishnan, Sreeram It is certified that error appears in the above-identified patent and that said Letters Patent is hereby corrected as shown below:

Column 10,
Line 24, delete "an" after "installing" and insert -- and executing --
Line 27, insert -- without executing the application program -- after "system"
Line 29, delete "and" after "representations;"
Line 31, change "engine." to -- engine; --; insert -- and receiving a voice command previously having been delivered to the vocabulary; and enabling the application program to be executed for the first time based on recognition of the received voice command. -- after "engine".

Signed and Sealed this

Fourth Day of February, 2003

JAMES E. ROGAN
*Director of the United States Patent and Trademark Office*